2,312,435

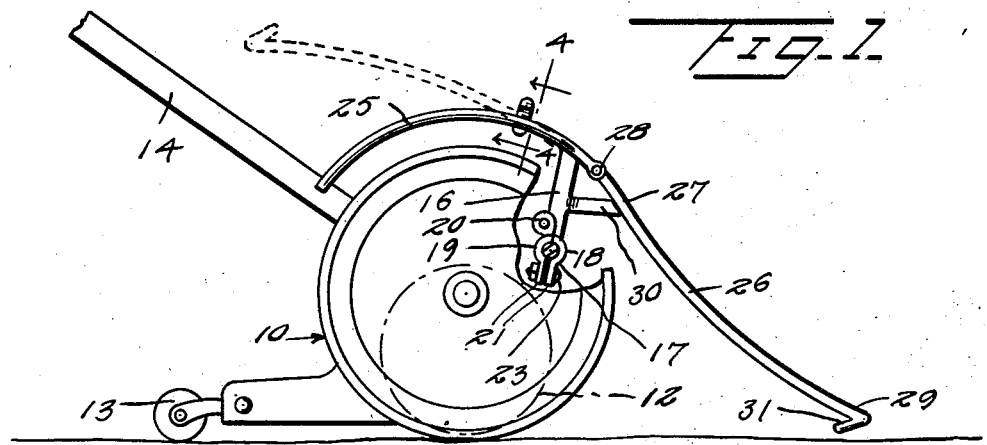
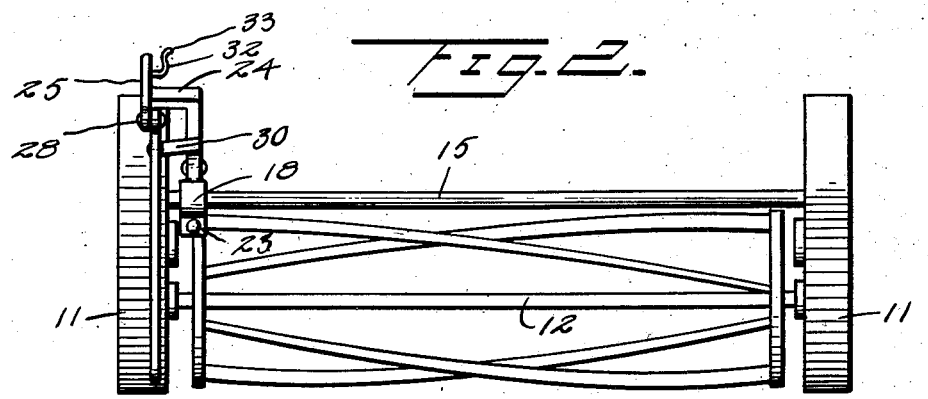
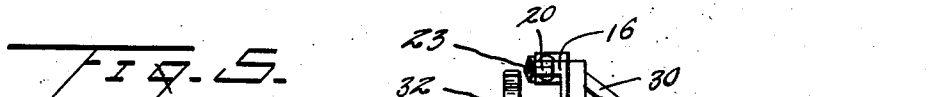
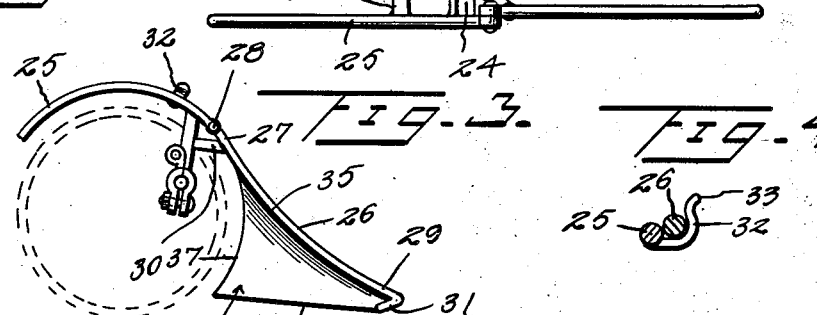
Thomas L. Nelson
INVENTOR
BY *Victor J. Evans & Co.*
ATTORNEYS Patented Mar. 2, 1943

UNITED STATES PATENT OFFICE 2,312,435

SHRUBBERY FENDER FOR LAWN MOWERS

Thomas L. Nelson, Delmar, Del.

Application October 27, 1941, Serial No. 416,705

3 Claims. (Cl. 56—249)

My invention relates broadly to new and useful improvements in lawn mowers, and more particularly to a fender attachment for lifting the low hanging leaves and branches of flowers or shrubs over the wheel and cutting blades of the lawn mower.

An important object of my invention is the provision of a fender attachment of the above-mentioned character which is adjustable in its nature to permit the same to be unobstructively disposed when it is desired to move the cutting blades of the lawn mower to an inoperative position.

Another object of my invention is the provision of a fender attachment of the above-mentioned character which is simple in its construction, inexpensive to manufacture and efficient and efficacious in the performance of its duties.

Other objects and advantages of my invention will be apparent during the course of the following description.

In the drawing, forming a part of this specification, and wherein like numerals are employed to designate like parts throughout the same, Figure 1 is a side elevation of a fender attachment embodying my invention, and showing the same attached to a lawn mower, Figure 2 is a front elevation of the same, Figure 3 is a top plan view of the fender attachment, Figure 4 is a fragmentary transverse sectional view taken on the line 4—4 of Figure 1, and Figure 5 is a side elevation of a modified form of the fender attachment.

In the accompanying drawing, wherein for the purpose of illustration, is shown a preferred embodiment of my invention, the numeral 10 designates a lawn mower of conventional construction having spaced wheels 11 and a rotary cutter 12 mounted therebetween. A supporting roller 13 extends rearwardly of the rotary cutter in the conventional manner and a handle 14 is provided to permit manual actuation thereof. The conventional lawn mower construction also includes a bumper bar or rod 15 located above and in advance of the rotary cutter. The opposite ends of the bumper bar are fixedly secured to stationary parts of the lawn mower frame and it is adapted to prevent the cutting blades of the cutter from being damaged by contact with trees, rocks, or the like.

My attachment includes a supporting arm 16 the lower end of which is provided with a clamp 17 adapted to detachably connect with the bumper bar 15 adjacent one of the wheels 11. Any suitable form of clamp may be used for connecting the supporting arm to the bumper. The form here illustrated comprises a stationary jaw 18 and a pivoted jaw 19 hingedly attached to the supporting bar, as at 20. Each of the jaws 18 and 19 is provided with extending lugs 21 normally disposed in slight spaced relation when the clamp is applied to the bumper bar whereby the nut 22 may be tightened on the bolt 23 to move the jaws into pressed frictional engagement with the bumper bar. The upper end of the supporting arm is formed with a laterally extending shank 24 which overhangs the periphery of the adjacent wheel 11. A stationary longitudinally arched fender 25, fixedly secured to the end of the shank 24, extends rearwardly thereof in circumferentially spaced relation with the wheel. When the lawn mower is operatively disposed in the cutting position, the fender 25 will be disposed above the wheel whereby the branches or leaves of any plant engaged by the fender will be held substantially above the wheel and rotary cutter, and as the lawn mower is moved beyond the plant, the fender will permit the branches or leaves to drop gently therebehind.

In order that the leaves or branches of the plants may be raised to engage the stationary fender 25, I have provided a movable fender 26 the end 27 of which is pivoted to the forwardly projecting end 28 of the stationary fender. The movable fender is arcuately longitudinally curved to present a substantially concave surface to the contacted leaves and branches and the lower end 29 thereof is supported in close proximity to the ground by the shank 30 which extends angularly from the supporting arm 16 to engage the bottom edge of the fender. The lower end 29 preferably extends to within about one-half an inch from the ground surface and, to prevent the same from imbedding itself in the ground, I have bent the same back upon itself to provide an essentially short runner 31. Thus, the movable fender is freely pivotal about the end 28 of the stationary fender and, inasmuch as it is merely supported by but not connected to the shank 30, it may oscillate about its pivot to readily accommodate itself to irregularities in the ground surface or to essentially small obstructing objects projecting above the ground surface.

Only one of the attachments is here illustrated as being attached to the lawn mower. If desired, of course, each wheel may be provided with one of the attachments, however, it is thought that for most purposes the lawn mower may be properly maneuvered in its operation to make only one of the attachments necessary. The wheel 11 with which the attachment is associated is moved to pass adjacent to or below the low hanging leaves or branches of a flower or shrub and, inasmuch as the fender 26 projects substantially in advance of the wheel, the lower end thereof will pass below the leaves and branches. As the lawn mower is further advanced, the leaves will slide along the concave upper edge of the fender and be deposited on the stationary fender 25. As described above, the branches and leaves will then be disposed substantially above the cutting blades of the lawn mower and, as the lawn mower moves beyond the shrub, the leaves and branches of the shrub are permitted to drop gently rearwardly thereof.

When the lawn mower is inoperatively positioned, as when the same is being moved from one location to another, and it is not desired that the cutter blades be moved the fender 26 would, if positioned as described above, prevent free movement of the lawn mower. As best illustrated in Figure 3, the connecting end of the fender 26 is pivoted in overlapping relation to the fender 25 and this unique pivotal connection between the fenders will permit the movable fender 26 to be pivoted upwardly until it assumes the dotted line position in Figure 1. In order that this bumper may be securely yet detachably held in this position, I have provided a spring keeper 32 which extends laterally from the fender 25. The outer end 33 of the keeper extends angularly outwardly whereby the pivoting fender 26 will flex the keeper as it moves into a position laterally of the stationary fender. As soon as the movable fender assumes a position substantially parallel to the fender 25 the resilient action of the keeper will hold the same against casual displacement.

Figure 5 illustrates a modified form of the invention in that an apron 24 is attached to the movable fender 26. The apron is essentially triangular-shaped in plan, the edge 35 thereof being shaped to abuttingly engage the bottom side of the fender 26 and the top surface of the runner 31. The inner edge 37 of the apron is arcuately curved for its entire length to position the same in equi-spaced relation with the periphery of the wheel 11 and the lower edge 38 thereof tapers angularly downwardly to the free edge of the runner 31. The apron may extend in a vertical plane, or the lower inner corner thereof may be bent outwardly to deflect the stalks of the leaves gathered by the fender 26 laterally and to one side of the lawn mower wheel.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. A lawn mower attachment comprising a support including a projecting lug portion and provision for detachably connecting with a lawn mower, a stationary fender carried by the support and arranged to arch over a wheel of the lawn mower, a movable fender pivoted to the said first fender and resting upon the projecting lug portion of the support, the said last fender being arranged to extend downwardly in advance of the mentioned wheel and the forward end thereof being bent back upon itself to provide a runner engageable with the ground to accommodate the fender to irregularities in the ground surface, and a spring catch adapted to retain the movable fender when the same is swung about its pivot and away from the supporting lug to assume an unobstructive position adjacent to the said stationary fender.

2. A lawn mower attachment comprising a support including a projecting lug portion and provision for detachably connecting with a lawn mower, a stationary fender carried by the support and arranged to arch over a wheel of the lawn mower, and a movable fender pivoted to the said first fender and resting upon the projecting lug portion of the support, the said last fender being arranged to extend downwardly in advance of the mentioned wheel and the forward end thereof being bent back upon itself to provide a runner engageable with the ground to accommodate the fender to irregularities in the ground surface.

3. An attachment for lawn mowers comprising a support member adapted for detachable connection with a mower, a fixed fender bar carried by the said support extending transversely over the mower, an adjustable fender bar pivotally connected to the forward end of the fixed fender, the said adjustable fender being disposed to extend forwardly and downwardly of the mower in operative position and to be swung through an upward vertical arc to a rearwardly directed position when inoperative, a projection on the support against which the adjustable fender rests in its operative position, and a resilient catch on the fixed fender for releasably holding the adjustable fender in retracted inoperative position.

THOMAS L. NELSON.